US007019190B1

(12) United States Patent
Lucas et al.

(10) Patent No.: US 7,019,190 B1
(45) Date of Patent: Mar. 28, 2006

(54) SOIL REMEDIATION SYSTEM

(75) Inventors: John Anthony Lucas, Newcastle (AU); Louis James Wibberley, Garden Suburb (AU)

(73) Assignee: Innova Soil Technology PTY LTD, New South Wales (AU)

( * ) Notice: Subject to any disclaimer, the term of this patent is extended or adjusted under 35 U.S.C. 154(b) by 0 days.

(21) Appl. No.: 09/786,184

(22) PCT Filed: Sep. 16, 1999

(86) PCT No.: PCT/AU99/00785

§ 371 (c)(1),
(2), (4) Date: Apr. 23, 2001

(87) PCT Pub. No.: WO00/18524

PCT Pub. Date: Apr. 6, 2000

(30) Foreign Application Priority Data

Sep. 28, 1998 (AU) .................. PP6185

(51) Int. Cl.
*B09C 1/06* (2006.01)
*F23G 7/14* (2006.01)

(52) U.S. Cl. ............... 588/320; 110/203; 110/204; 110/236; 110/246; 110/254; 405/128.85; 588/321; 588/402; 588/405; 588/406; 588/900

(58) Field of Classification Search ......... 588/209, 588/214, 230, 900, 320, 321, 402, 405, 406; 110/204, 236, 246, 254, 203; 405/128.85
See application file for complete search history.

(56) References Cited

U.S. PATENT DOCUMENTS

| 3,918,373 A | * | 11/1975 | Fritz et al. ............ 110/189 |
|---|---|---|---|
| 4,715,965 A | | 12/1987 | Sigerson et al. |
| 4,815,398 A | * | 3/1989 | Keating et al. ............ 110/233 |
| 4,970,971 A | | 11/1990 | Williams |
| 4,974,528 A | | 12/1990 | Barcell |
| 5,164,158 A | | 11/1992 | Brashears |
| 5,170,726 A | * | 12/1992 | Brashears et al. .......... 110/236 |
| 5,228,804 A | | 7/1993 | Balch |
| 5,378,083 A | | 1/1995 | Swanson |
| 5,393,501 A | | 2/1995 | Clawson et al. |
| 5,414,205 A | * | 5/1995 | Tischler ............ 588/214 |

(Continued)

FOREIGN PATENT DOCUMENTS

DE    OS 34 47 079    12/1984

(Continued)

OTHER PUBLICATIONS

EPO Search Report for EP 99 96 9689, with mailing date of Apr. 2, 2004.*

(Continued)

*Primary Examiner*—Stanley S. Silverman
*Assistant Examiner*—Ardith E. Hertzog
(74) *Attorney, Agent, or Firm*—Merchant & Gould P.C.

(57) ABSTRACT

A process and apparatus for energy efficient remediation of soil contaminated with hydrocarbons, including desorbing the hydrocarbon contaminants from a bed of the soil by thermal desorption in a treated desorption chamber (20) and thereafter combusting the contaminants in a thermal oxidiser (30). The combustion air for the desorption chamber and the thermal oxidiser, and the desorbed contaminants prior to admission to said thermal oxidiser, are preheated by heat exchange (40) with offgases from the thermal oxidiser. The offgases are then rapidly quenched at below 200° C.

45 Claims, 2 Drawing Sheets

U.S. PATENT DOCUMENTS

| | | | |
|---|---|---|---|
| 5,455,005 A | | 10/1995 | Clawson et al. |
| 5,466,418 A | * | 11/1995 | Swanson et al. ............ 422/111 |
| 5,596,935 A | | 1/1997 | Swanson |
| 5,625,119 A | * | 4/1997 | Tischler ...................... 588/205 |
| 5,655,465 A | * | 8/1997 | Robertson .................. 110/346 |
| 5,658,094 A | | 8/1997 | Clawson |
| 5,744,691 A | * | 4/1998 | Tischler ...................... 588/214 |
| 5,904,904 A | * | 5/1999 | Swanson .................... 422/182 |
| 6,213,030 B1 | * | 4/2001 | Robertson et al. .......... 110/246 |

FOREIGN PATENT DOCUMENTS

EP  0 155 022  2/1985

OTHER PUBLICATIONS

International Search Report for PCT/AU99/00785, w/mailing date of Nov. 26, 1999.

* cited by examiner

SOIL REMEDIATION SYSTEM

FIELD OF THE INVENTION

The present invention relates to the remediation of soil contaminated with hydrocarbons, utilising thermal desorption followed by thermal oxidation.

BACKGROUND ART

There are numerous other types of processes for remediating soils, including soil washing, in-situ air stripping, in-situ vitrification, stabilisation, vacuum extraction and solvent extraction. However, the most universally proven and efficient method for removing organics from soil is thermal desorption, which together with treatment or destruction of the desorbed organics is termed thermal remediation. Hydrocarbon contaminants which are treatable with thermal remediation include:

Volatile organic compounds (VOC) eg petrol, diesel,
Aromatic hydrocarbons eg benzene, tars,
Dioxins and furans,
Semi-volatile organic compounds (SVOCs),
Polynuclear aromatic hydrocarbons (PAHs or PNAs),
Polychlorinated biphenyls (PCBs), and
Pesticides (eg organochlorins such as dieldrin and aldrin).

Thermal remediation of contaminated soil uses heat to physically separate hydrocarbon based contaminants from feed material which may be, for example, directly recovered soils, sediments, sludges or filter cakes. The separated hydrocarbons are then combusted or thermally oxidised to produce essentially carbon dioxide and water vapour.

The most common process configuration involves a counter-current direct fired desorber, but there are numerous variants. The most common alternative is the co-current desorber, which produces a hotter contaminated offgas stream. To avoid cooling these gases to enable fabric filtration, a cyclone is used to remove some of the dust prior to thermal oxidation, followed by gas cooling then fabric filtration. In another variant the functions of the thermal desorber and oxidiser are combined by arranging to combust the contaminant gases within a metal jacketed combustion chamber within a rotary desorber.

U.S. Pat. No. 5,658,094 discloses an arrangement in which heat exchangers are used for preheating combustion air for a thermal desorber. In that arrangement, there is described a combined (all metal) rotary device, a type of rotary kiln with internal indirect heating of both soil and combustion air, which is claimed to carry out combined thermal desorption and thermal oxidation.

German patent application 3447079 describes a process in which the contaminated soil is thermally treated in a rotary kiln by the direct addition of hot combustion gases and/or air. The decomposition products are partially combusted in the rotary kiln, with the remaining production gas fed to a waste gas combustion chamber where it is afterburnt at high temperatures. In general, the post-combustion waste gases are cooled and released into the atmosphere.

Various other methods of thermal remediation of soil are described in U.S. Pat. Nos. 5,455,005, 5,393,501, 4,715,965, 4,974,528, and 5,378,083.

The main difference between different technologies is the equipment used for thermal desorption, which may be one of four main types, the advantages and disadvantages of which are summarised in Table 1 (obtained from various sources, including W. L. Troxler et al, "Treatment of non-hazardous petroleum-contaminated soils by thermal desorption technologies", Jnl of Air and Waste, Vol. 43, November 1993, and W. C. Anderson, "Innovative site remediation technology", Thermal Desorption, WASTECH, 1993).

TABLE 1

Main Types of Thermal Remediation

| | Advantages | Disadvantages |
|---|---|---|
| Direct fired rotary kilns | High rates of heat transfer. Smaller desorber than indirect fired. Simplest, most robust. Most flexible to variation in feed material and type and level of contamination. | Larger thermal oxidiser than for indirect fired. Dilution strategies are usually required for hydrocarbon contamination levels of >4% to avoid exceeding the LEL of desorber offgases. |
| Indirect fired rotary kilns | May allow economic recovery of hydrocarbons. Lower dust losses from desorber. | Unsuitable for heavy contamination, especially of long chain or aromatic hydrocarbons (tars). Larger desorber. Higher moisture soils severely impair capacity. |
| Combination direct/indirect fired desorber, with integral thermal oxidiser | Process simplification by using a single process step. | Inability to process large gas volumes. Lower peak soil temperatures will prevent practical decontamination of heavily contaminated soils, especially with PAHs or PCBs. Less suitable for high moisture soils. |
| Direct fired conveyors, including metal belts and screws | As for indirect fired rotary kilns. Improved control over solids residence time. | As for indirect fired rotary kilns. |
| Direct fired fluidised beds | Highest process intensity. | Increased complexity. Increased dust losses/recycling of dusts. Requires fine and uniform sized material (normally less than 5 mm). Increased maintenance (abrasion). |

Remediation plants may be either stationary or mobile, with the larger, stationary plants being restricted to remediation of large heavily contaminated sites (eg large integrated steelworks sites), regional clusters of contaminated sites, or under circumstances where transport of contaminated materials is economic and not hazardous.

Key technical factors in thermal remediation include:

Solids temperature and contact time.

Soil moisture when treated.

Actual soil hydrocarbon contaminants present.

Other contamination, eg chlorine compounds and heavy metals.

Extraneous rubble.

It is an object of the present invention to provide an improved method and apparatus for remediating soil contaminated with hydrocarbons that is capable in preferred embodiment of optimising energy usage and operating costs for a given soil throughput, and that is preferably adaptable to treat short chain, long chain, aromatic, and polychlorinated hydrocarbons. In particular embodiments, it is further desired to minimise environmental impacts, especially greenhouse gases, $NO_x$ and dioxin/furan emissions.

SUMMARY OF INVENTION

The invention accordingly provides, in a first aspect, a process for remediating soil contaminated with hydrocarbons, including:

desorbing the hydrocarbon contaminants from a bed of the soil by thermal desorption in a treated desorption chamber and thereafter combusting the contaminants in a thermal oxidiser;

wherein combustion air for said desorption chamber and said thermal oxidiser, and said desorbed contaminants prior to admission to said thermal oxidiser, are preheated by heat exchange with offgases from the thermal oxidiser.

The invention further provides, in its first aspect, apparatus for remediating soil contaminated with hydrocarbons, including:

first furnace means defining a desorption chamber in which a bed of said soil may be treated to separate the hydrocarbon contaminants from the soil by thermal desorption;

second furnace means for combusting hydrocarbon contaminants by thermal oxidation;

means for conveying combustion air to said desorption chamber and to said second furnace means, and for conveying the desorbed contaminants from the desorption chamber to the second furnace means; and heat exchange means arranged for preheating said combustion air and said desorbed contaminants by heat exchange with offgases from the second furnace means.

Preferably, the heat exchange means is further arranged in a series configuration so that said offgases preheat the combustion air first and then the desorbed contaminants.

Advantageously, the heat exchange means is directly installed in the hot gas duct at the offgas outlet end of the second furnace means for thermal oxidation, and is preferably arranged for co-current flow. The leading tube bank of the heat exchange means preferably incorporates variable tube spacing to facilitate the aforementioned direct installation (preferably without radiation shields or excess metal temperatures).

There may be an energy dump valve from the heat exchange means for venting of excess preheated air as will occur during treatment of higher contaminated soil. Preferably, the process and energy dump valve are controlled to maintain metal temperatures above 500° C., to minimise dioxin formation from PCB or salt contaminated soils, but below 700° C. to minimise metal oxidisation, corrosion and expansion damage. The heat exchange means may have a hot gas by-pass duct and damper system in either or both the offgas duct or by-pass duct to control hot gas flow through both the combustion air and contaminants heat exchanges.

The heat exchanger for the contaminants may have either co-current or counter current flow, and may be adapted to be made reversible depending on operating conditions.

In a second aspect, the invention provides a process for remediating soil contaminated with hydrocarbons, including:

desorbing the hydrocarbon contaminants from a bed of the soil by thermal desorption in a treated desorption chamber and thereafter combusting the contaminants in a thermal oxidiser, combusting the desorbed contaminants at least in part within said desorption chamber by controlled admission of air into said chamber above said bed to effect such combustion;

wherein the separated contaminants are treated in said thermal oxidiser in at least two stages, including a combustion stage in which the contaminants are combusted with a first supply of combustion air at a substantially adiabatic temperature in the range 900–1200° C., and a second stage in which a second supply of combustion air is admitted for combustion of residual compounds and for controlling the offgas outflow temperature.

In its second aspect, the invention further provides apparatus for remediating soil contaminated with hydrocarbons, including:

first furnace means defining a desorption chamber in which a bed of said soil may be treated to separate the hydrocarbon contaminants from the soil by thermal desorption;

second furnace means for combusting hydrocarbon contaminants by thermal oxidation;

means for controlled admission of air into said desorption chamber above said bed to effect in the said chamber at least partial combustion of said desorbed contaminants in gaseous form;

means for conveying the products of said at least partial combustion to said second furnace means for further combustion therein; and wherein said second furnace means for thermal oxidation includes at least two stages including a combustion stage in which the contaminants are combusted with a first supply of combustion air at a substantially adiabatic temperature in the range 900–1200° C., and a second stage in which a second supply of combustion air is admitted for combustion of residual compounds and for controlling the offgas outflow temperature.

Preferably, the desorption chamber is provided in a rotary kiln that thereby constitutes the first furnace means and is preferably inclined. The contaminated soil, which is advantageously optimally sized and prepared, is preferably admitted to an upper, cooler end of the rotary kiln at a controlled rate, and the rotation of the kiln then causes the soil to move down the inside of the kiln towards the hotter end containing a burner. The heat from the burner and other exothermic reactions in the kiln heats the soil, causing it to dry and "desorb" (a term which includes without limitation evaporation, decomposition and gasification) contained hydrocarbon contaminants.

Preferably, the at least partial combustion of the contaminants in the desorption chamber occurs both in close proximity to the soil bed and in the hot gas stream passing along the desorber. The air admitted to effect such combustion may be injected at the burner end of the desorption chamber. The first furnace means is preferably a high velocity desorber burner which provides a highly collimated stream of high temperature gases along the centre of the desorber.

In the preferred operation of the first stage of the thermal oxidiser, preheated near stoichiometric amounts of combustion air, preheated dedusted desorber offgases, ie desorbed contaminants, and auxiliary fuel are injected, preferably via a nozzle mix burner. The fuel rate and preheat to this burner is arranged to give said adiabatic flame temperature of the mixture of 900–1200° C., and thus avoids localised high temperatures and high $NO_x$ from the use of preheated combustion air. However, the temperature is sufficient to destroy any gaseous contaminants in the desorber gases. These hot gases then pass into the second zone of the thermal oxidiser where cold or preheated combustion air is injected into the hot gas stream to provide additional mixing and oxygen for combustion of residual compounds, and to control the gas inlet temperature to the heat exchangers.

The invention also extends to methods or apparatus incorporating both of the aspects of the invention.

The offgas from thermal oxidation may be further treated (eg after said heat exchanges in the first aspect of the invention) by one or more modular off-gas treatments according to the nature of the original contaminants, and the requirements of the soils being remediated. For low chlorine containing soils, such an off-gas treatment system may be omitted, and replaced with a short stack. For higher chlorine containing soils, where the risk of dioxin or hydrochloride containing gases is evident, a scrubber section may be used. A suitable scrubber can treat most of the offgases. A small bleed of hot off-gas or preheated combustion air is allowed to by-pass the scrubber to provide reheating of the scrubbed gas stream in the stack thereby preventing drooping or visible plumes. For gases of intermediate chlorine compound content, a module comprising an ambient air quenching module may be used, wherein a large volume of ambient air is injected into the offgases to rapidly quench them to less than 200° C.

DESCRIPTION OF PREFERRED EMBODIMENTS

Figure 1:
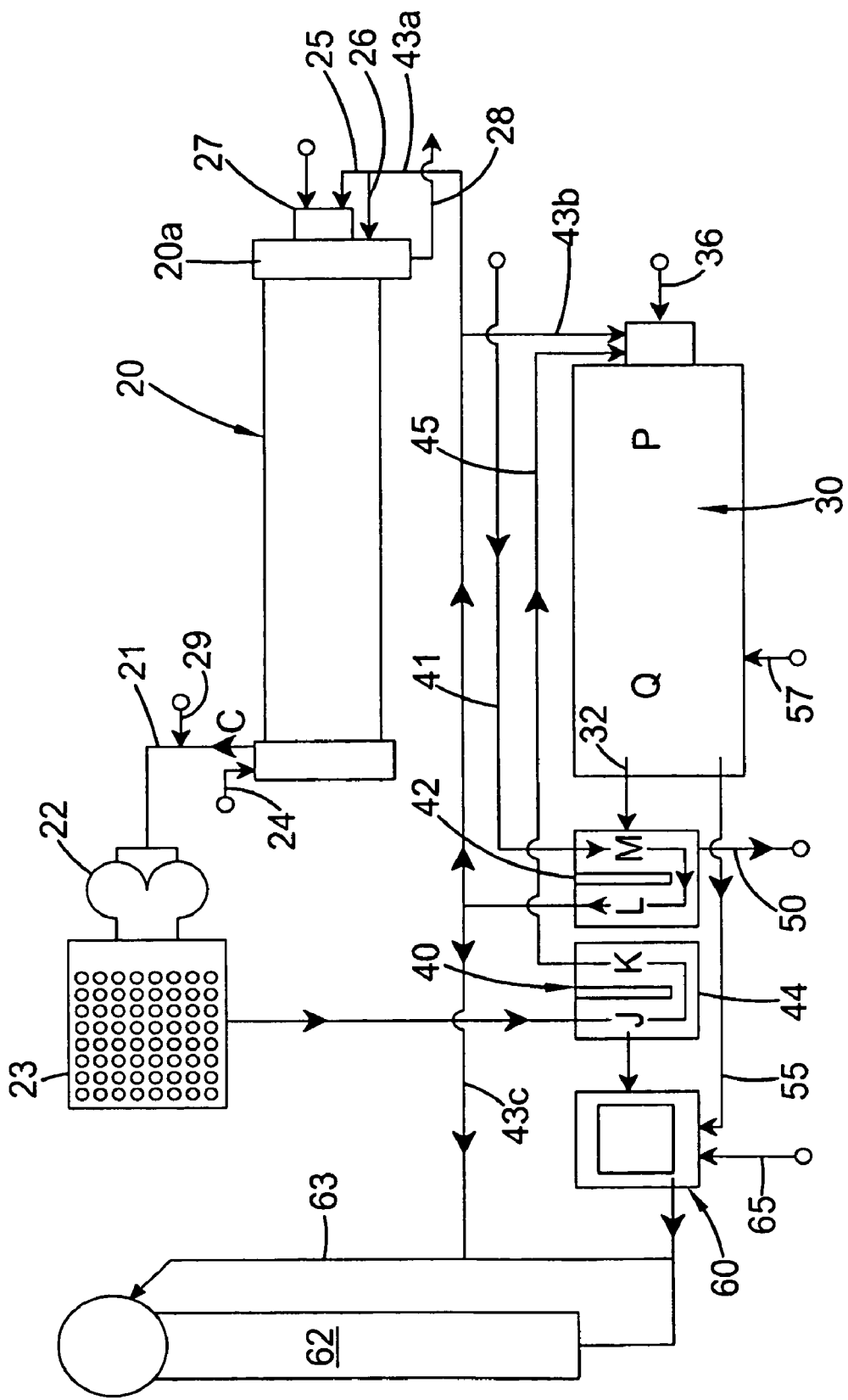
FIG. 1 is a block flow diagram of an apparatus incorporating embodiments of the principal aspects of the invention.

The illustrated system includes a pair of furnaces 20, 30, being a slightly inclined countercurrent rotary kiln 20 for effecting thermal desorption and a 2-stage thermal oxidiser 30. The off-gases 32 from thermal oxidiser 30 pass directly through a 2-stage heat exchanger 40. In the first stage 42 of the series arrangement, itself consisting of a pair of sub-stage tube banks M, L, cold combustion air admitted along supply duct 41 is pre-heated for delivery to the lower, burner ends of desorber kiln 20 and oxidiser 30 by respective combustion air ducts 43a, 43b. In the second stage 44 of heat exchanger 40, again consisting of respective sub-stage tube banks J, K, off-gases (including desorbed contaminants) recovered from the upper end of desorber kiln 20 via line 21, and cleaned and dedusted by cyclone 22 and bagfilter 23, are pre-heated for delivery to the burner end of thermal oxidiser 30 via contaminant vapours supply line 45. Preheating may be to a temperature in the range 350–500° C.

Sized and otherwise prepared soils requiring remediation are transferred at a controlled rate into the upper or cooler end of desorber kiln 20 at delivery port 24. The desorber kiln is inclined so that its rotation causes the soil to move down inside the kiln towards the burner end 20a. The heat from the burner 27 and from other exothermic reactions in the kiln, heats the soil, causing it to dry and desorb contained hydrocarbon contaminants.

Figure 2:
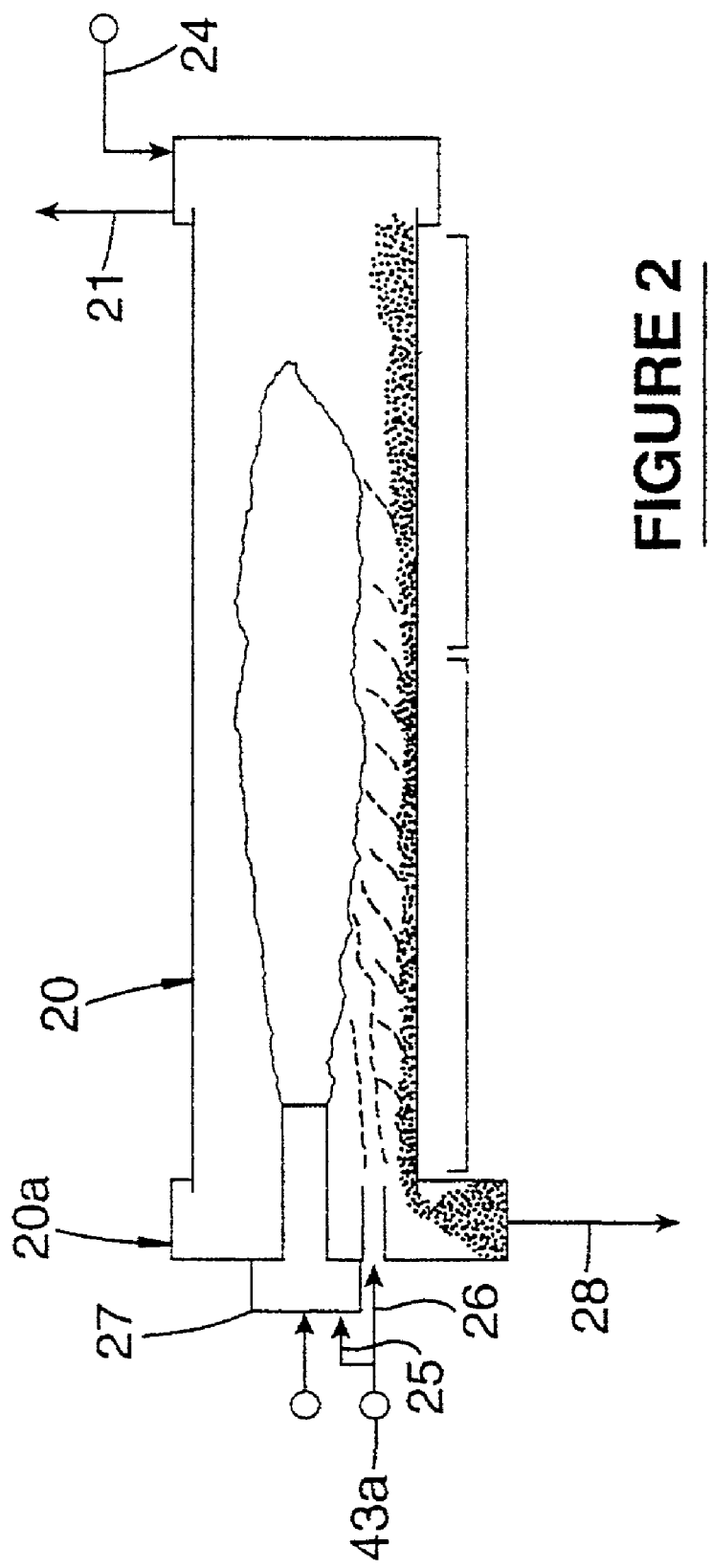
FIG. 2 is a diagram depicting combustion of desorbed contaminants in the desorber kiln.

The pre-heated combustion air in delivery duct 43a for desorber kiln 20 is divided into a first stream 25 for burner 27, and a second stream 26 of overbed combustion air for effecting at least partial combustion of the desorbed hydrocarbon contaminants within the kiln. This combustion takes place both in close proximity to the soil bed in the kiln and to the soil particles cascading through the hot gas stream, and in the hot gas stream passing along its interior. A suitable kiln for the desorber 20 is a high velocity burner such as the North American Hi Ram kiln burner, which provides a highly collimated stream of high temperature gases along the centre of the kiln. Application of this burner type with the abovementioned admission of overbed air 26 ensures efficient and reliable ignition of hydrocarbons as they evolve from the soil as it progresses along the kiln, as depicted in FIG. 2.

In the case of soils with high hydrocarbon contamination levels, energy conservation will be secondary to controlling the level to be below the Lower Explosive Limited (LEL) (typically 1½–2%) of the desorber off-gas. For this situation, the temperature of the desorber off-gases in duct 21 may be increased by controlling both the energy input to the desorber burner 27 and the amount of insitu combustion, to allow dilution of the desorber off-gases prior to gas cleaning. Controlled amounts of water may be injected via sprays 29 located in duct 21 immediately downstream of the desorber kiln. Thus as hydrocarbon contamination increases to a value above the LEI, combustion is controlled in the kiln both to mimimise energy consumption and to keep the hydrocarbon level in the off-gas below the LEL: energy efficiency and safety issues must both be managed.

Remediated soil is recovered from desorber kiln at 28 at burner end 20a. The vapours exiting the desorber in duct 21 typically at around 275° C., typically comprise 50% steam, 5% carbon dioxide, 44% nitrogen, and approximately 0.5–1% volatile hydrocarbons contaminants desorbed from the soil bed. As previously mentioned these vapours are cleaned of solid matter entrained from the kiln by cyclone 22 and/or bagfilter 23 before being pre-heated in heat exchanger stage 44 and injected into the thermal oxidiser via line 45.

The thermal oxidiser 30 is a 2-stage refractory-lined chamber comprising one or more burners to assist complete combustion of the hydrocarbon contaminated vapours from the thermal desorber. Typically the gases are heated and combusted at 1000–1200° C. for approximately 1000 ms. To minimise $NO_x$ formation, and to decrease radiation to the front of the heat exchanger, the thermal oxidiser has two sequential combustion zones; i) the primary combustion zone (P) and, ii) the post-combustion zone (O). Preheated combustion air, preheated contaminant vapours and auxiliary fuel are injected into the primary combustion zone using, preferably, but not restricted to, a nozzle mixing burner or burners 36. The air in the gas mixture is controlled to give an overall stoichiometric or slightly sub-stoichiometric combustion. Additional unheated combustion air is injected via ports around the periphery and at the entry to an afterburner 57 to give an overall excess oxygen in the hot gases of approximately 3% to ensure complete destruction of contaminant hydrocarbons, to provide additional turbulence, and to control the temperature of the gases entering the heat exchanger to typically between 950 and 1100° C. Gas temperatures above 1100° C. will lead to decreased heat exchanger life.

Features of heat exchanger 40 include a wider tube spacing for the leading rows of tubes (typically three rows, to decrease convective heat transfer to these rows subject to high radiant heat fluxes), in bank M, and an energy dump valve 50. The combination of these features allows direct installation of heat exchanger 40 in the hot gas duct at the outlet of thermal oxidiser 30, without the need for radiation shields and without incurring excess metal temperatures. This saves weight and cost. Dump valve 50 allows venting of excess pre-heated air from the leading tube bank M during operation. This dumping allows accurate control of the process energy balance with varying moisture and hydrocarbon contamination levels. In addition, this facility decreases manufacturing costs for the heat exchanger by allowing the use of lower alloy steels, and increases heat exchanger life.

An optional feature to cope with even more extreme and variable operating conditions is to equip heat exchanger 40 with a bypass duct 55 and associated damper (either in one or both of the heat exchanger stages), to further increase the flexibility of the process to treat higher contaminated soils, and to improve the operational safety of the heat exchanger stages.

The heat exchanger features, together with controlled combustion of hydrocarbon contaminants in desorber kiln 20, the use of nozzle mixing burners, and the 2-stage combustion in thermal oxidiser 30, combine to minimise overall energy consumption and therefore operating costs, greenhouse gas and $NO_x$ emissions, and to increase throughput by minimising the gas volumes processed. These features also allow maintenance of metal temperatures above 500° C. to minimise dioxin formation from PCB or salt-contaminated soils, but below 700° C. to minimise exchanger metal oxidisation and corrosion. In addition, the system design allows control such that the heat exchanger exit gas temperature is maintained above 600° C. to further minimise dioxin formation.

It is believed that, relative to no pre-heating, a total 55% reduction in energy consumption is achieved with the illustrated system by pre-heating all combustion air and the contaminant hydrocarbon vapours, at a level where combustion of hydrocarbon vapours in desorber kiln 20 is at about 20%. The reduction in energy consumption is complemented by reduced $CO_2$ and $NO_x$ levels.

A further advantage of preheating is that the size of the thermal oxidiser in particular, and to a lesser extent the kiln and the baghouse, can be reduced.

The drawing also illustrates several modules for further off-gas treatment downstream of heat exchanger 40. These modules may be variously provided according to the characteristics of the contamination. For low chlorine containing soils, there is no further off-gas treatment and a short refractory line stack 60 is utilised. This approach minimises water and electrical energy consumption.

For high chlorine or PCB containing soils, where the risk of dioxin or hydrochloride containing gases is high, a scrubber section 62 is used to quench the off-gases and remove the chlorides. A preferred embodiment under these conditions is to allow a small bleed of hot off-gas (about 10%, depending on contamination levels) to bypass the scrubber on line 63 to provide sufficient re-heating of the scrubbed gas stream in the stack to prevent drooping or visible fumes. A proportion of the pre-heated combustion air may also be delivered to this bypass 63 by a delivery duct 43c.

For gases of intermediate chlorine compound content, an ambient air quenching module is used, wherein a large volume of ambient air is injected at 65 into stack 60 to rapidly quench (within less than 750 ms) the off-gases to below 200° C. Such a module might comprise, for example, a fan sucking in ambient air or an ejector powered by the hot offgases.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A process for remediating soil contaminated with hydrocarbons, including:
   desorbing the hydrocarbon contaminants from a bed of the soil by thermal desorption in a desorption chamber and thereafter combusting the contaminants in a thermal oxidiser;
   wherein combustion air for said desorption chamber and said thermal oxidiser, and said desorbed contaminants prior to admission to said thermal oxidiser, are preheated by heat exchange with offgases from the thermal oxidiser;
   and wherein, after said heat exchange with said combustion air and said desorbed contaminants, said offgases from the thermal oxidiser are rapidly quenched to below 200° C.

2. A process according to claim 1, wherein said offgases preheat the combustion air first and then the desorbed contaminants.

3. A process accordingly to claim 1, wherein excess preheated air is vented during treatment of soil with high hydrocarbon contamination levels.

4. A process according to claim 1, wherein the heat exchange is conducted in a heat exchanger having metal heat exchange surfaces and wherein the metal surface temperatures are maintained above 500° C. and below 700° C.

5. A process according to claim 4, wherein the heat exchanger is arranged for co-current flow.

6. A process according to claim 1, wherein the hot gas flow through both the combustion air and contaminants heat exchanges is controlled.

7. A process according to claim 1, wherein the separated contaminants are treated in said thermal oxidiser in at least two stages, including a combustion stage in which the contaminants are combusted with a first supply of combustion air at a substantially adiabatic temperature in the range 900–1200° C., and a second stage in which a second supply of combustion air is admitted for combustion of residual compounds and for controlling the offgas outflow temperature.

8. A process according to claim 1, wherein desorbed contaminants in gaseous form are at least in part combusted within said desorption chamber by controlled admission of air into said chamber above said bed to effect such combustion.

9. A process according to claim 1, wherein said rapid quenching is by injection of ambient air.

10. A process according to claim 9, wherein said ambient air is injected by an ejector powered by said offgases.

11. A process according to claim 1, wherein a proportion of offgases from the thermal oxidiser bypasses said heat exchange with said combustion air and said desorbed contaminants and is subjected to said rapid quenching to below 200° C.

12. A process according to claim 1, wherein said rapid quenching is carried out in less than 750 ms.

13. Apparatus for remediating soil contaminated with hydrocarbons, including:
   a first furnace defining a desorption chamber in which a bed of said soil is treated to separate the hydrocarbon contaminants from the soil by thermal desorption;
   a second furnace for combusting said hydrocarbon contaminants by thermal oxidation;
   respective ducts for conveying combustion air to said desorption chamber and to said second furnace, and for conveying the desorbed contaminants from the desorption chamber to the second furnace;

a heat exchange configuration for preheating said combustion air and said desorbed contaminants by heat exchange with offgases from the second furnace; and a quenching module for rapid quenching of said offgases to below 200° C. after said heat exchange with said combustion air and said desorbed contaminants.

14. Apparatus according to claim 13, wherein the heat exchange configuration is a series configuration so that said offgases preheat the combustion air first and then the desorbed contaminants.

15. Apparatus according to claim 14, wherein the heat exchange configuration is directly installed in the hot gas duct at the offgas outlet end of the second furnace.

16. Apparatus according to claim 14, wherein the heat exchange configuration is arranged for co-current flow.

17. Apparatus according to claim 13, wherein the heat exchange configuration is directly installed in the hot gas duct at the offgas outlet end of the second furnace.

18. Apparatus according to claim 17, wherein the heat exchange configuration is arranged for co-current flow.

19. Apparatus according to claim 17, wherein the leading tube bank of the heat exchange configuration incorporates variable tube spacing to facilitate said direct installation.

20. Apparatus according to claim 13, further including an energy dump valve from the heat exchange configuration for venting of excess preheated air.

21. Apparatus according to claim 13, wherein the heat exchange configuration includes combustion air and contaminants heat exchangers that includes a hot gas by-pass and damper system or by-pass duct to control hot gas flow through both the combustion air and contaminants heat exchangers.

22. Apparatus according to claim 21, wherein the heat exchanger for the contaminants is adapted to be made reversible depending on operating conditions.

23. Apparatus according to claim 13, wherein said second furnace includes at least two stages including a combustion stage in which the contaminants are combusted with a first supply of combustion air at a substantially adiabatic temperature in the range 900–1200° C., and a second stage in which a second supply of combustion air is admitted for combustion of residual compounds and for controlling the offgas outflow temperature.

24. Apparatus according to claim 13, further including:
a control device for controlled admission of air into said desorption chamber above said bed to effect in the said chamber at least partial combustion of said desorbed contaminants in gaseous form; and
a duct for conveying the products of said at least partial combustion to said second furnace for further combustion therein.

25. Apparatus according to claim 13, wherein said quenching module comprises an ambient air injection device.

26. Apparatus according to claim 25, wherein said ambient air injection device comprises an ejector powered by said offgases.

27. Apparatus according to claim 13, further comprising a duct that bypasses said heat exchange configuration to said quenching module for conveying a proportion of offgases from the thermal oxidiser direct to the quenching module.

28. Apparatus according to claim 13, wherein said quenching module is arranged to carry out said rapid quenching in less than 750 ms.

29. A process for remediating soil contaminated with hydrocarbons, including:
desorbing the hydrocarbon contaminants from a bed of the soil by thermal desorption in a desorption chamber and thereafter combusting the contaminants in a thermal oxidiser;
wherein offgases from the thermal oxidiser are utilised to preheat process feed gases by heat exchange with the offgases and are thereafter rapidly quenched to below 200° C.

30. A process according to claim 29, wherein the heat exchange is conducted in a heat exchanger having metal heat exchange surfaces and wherein the metal surface temperatures are maintained above 500° C. and below 700° C.

31. A process according to claim 30, wherein the heat exchanger is arranged for co-current flow.

32. A process according to claim 29, wherein the separated contaminants are treated in said thermal oxidiser in at least two stages, including a combustion stage in which the contaminants are combusted with a first supply of combustion air at a substantially adiabatic temperature in the range 900–1200° C., and a second stage in which a second supply of combustion air is admitted for combustion of residual compounds and for controlling the offgas outflow temperature.

33. A process according to claim 29, wherein said rapid quenching is by injection of ambient air.

34. A process according to claim 33 wherein said ambient air is injected by an ejector powered by said offgases.

35. A process according to claim 29, wherein a proportion of offgases from the thermal oxidiser bypasses said heat exchange and is subjected to said rapid quenching to below 200° C.

36. A process according to claim 29, wherein said rapid quenching is carried out in less than 750 ms.

37. Apparatus for remediating soil contaminated with hydrocarbons, including:
a first furnace defining a desorption chamber in which a bed of said soil is treated to separate the hydrocarbon contaminants from the soil by thermal desorption;
a second furnace for combusting said hydrocarbon contaminants by thermal oxidation;
a heat exchange configuration of preheating furnace feed gases by heat exchange with the offgases; and
a quenching module for rapid quenching of said offgases to below 200° C. after said heat exchange with furnace feed gases.

38. Apparatus according to claim 37, wherein the heat exchange configuration is directly installed in the hot gas duct at the offgas outlet end of the second furnace.

39. Apparatus according to claim 38, wherein the heat exchange configuration is arranged for co-current flow.

40. Apparatus according to claim 38, wherein the leading tube bank of the heat exchange configuration incorporates variable tube spacing to facilitate said direct installation.

41. Apparatus according to claim 37, wherein said second furnace includes at least two stages including a combustion stage in which the contaminants are combusted with a first supply of combustion air at a substantially adiabatic temperature in the range 900–1200° C., and a second stage in which a second supply of combustion air is admitted for combustion of residual compounds and for controlling the offgas outflow temperature.

42. Apparatus according to claim 37, wherein said quenching module comprises an ambient air injection device.

43. Apparatus according to claim 42, wherein said ambient air injection device comprises an ejector powered by said offgases.

44. Apparatus according to claim 37, further comprising a duct that bypasses said heat exchange configuration to said quenching module for conveying a proportion of offgases from the thermal oxidiser direct to the quenching module.

45. Apparatus according to claim 37, wherein said quenching module is arranged to carry out said rapid quenching in less than 750 ms.

* * * * *